March 29, 1960 L. A. WIGGS 2,930,245
VALVE OPERATING MECHANISM
Filed Dec. 16, 1957 2 Sheets-Sheet 1

INVENTOR.
LAWRENCE A. WIGGS
BY
ATTORNEYS

March 29, 1960  L. A. WIGGS  2,930,245
VALVE OPERATING MECHANISM
Filed Dec. 16, 1957  2 Sheets-Sheet 2
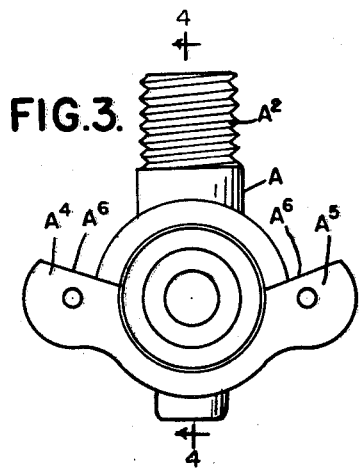
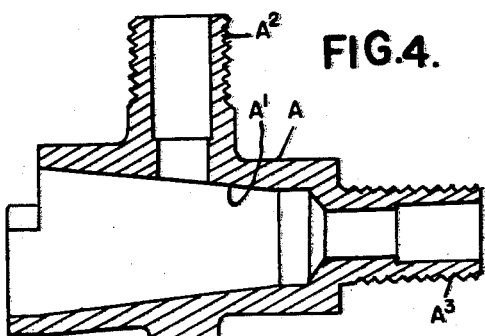
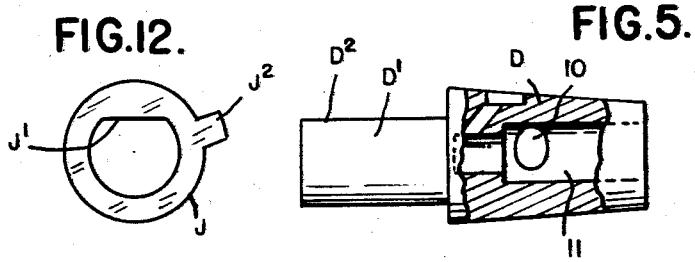
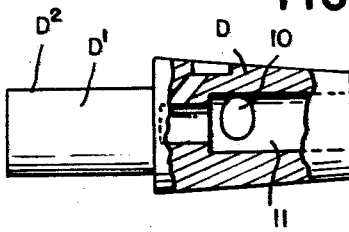
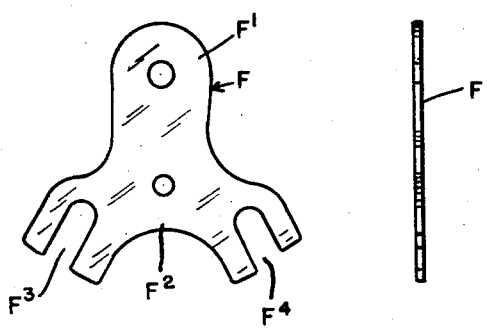
INVENTOR.
LAWRENCE A. WIGGS
BY
ATTORNEYS United States Patent Office 2,930,245
Patented Mar. 29, 1960

2,930,245

VALVE OPERATING MECHANISM

Lawrence A. Wiggs, Bedford, Ind., assignor to The Roberts Brass Manufacturing Co., Mitchell, Ind., a corporation of Michigan Application December 16, 1957, Serial No. 702,903

10 Claims. (Cl. 74—96)

This invention relates generally to valves, and refers more particularly to the operating mechanism for gas valves of the rotary plug type, such as those used for controlling the supply of gas to gas burners.

One of the essential objects of the invention is to provide an operating mechanism wherein an operating member for the rotary plug of the valve travels through a rectilinear path, instead of moving annularly or angularly, as heretofore.

Another object is to provide an operating mechanism wherein means connected to the operating member and plug is operable during rectilinear movement of the operating member to convert the rectilinear movement of the operating member into rotary movement of the plug.

Another object is to provide an operating mechanism wherein the actuating means for the rotary plug of the valve includes a toggle lever and crank arm assembly capable of being operated with ease for regulating the flow of gas through the valve to the gas burner.

Another object is to provide an operating mechanism that may be utilized with a gas valve for controlling the flow of gas to various gas appliances such as gas furnaces, gas fired room heaters, gas incinerators, gas clothes dryers etc.

Another object is to provide an operating mechanism that is simple in construction, economical to manufacture, and efficient in use.

Other objects, advantages and novel details of construction of this invention will be made more apparent as this description proceeds, especially when considered in connection with the accompanying drawings wherein:

Fig. 3 is a front elevational view of the valve body.

Fig. 4 is a longitudinal sectional view taken on line 4—4 of Fig. 3.

Fig. 5 is a longitudinal sectional view through the rotary plug, and showing the stem in elevation.

Figure 8:
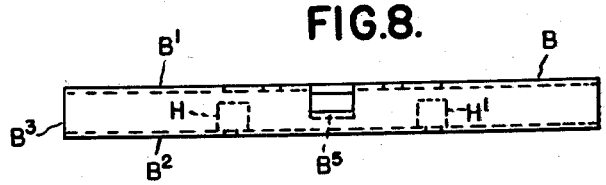
Figure 7:
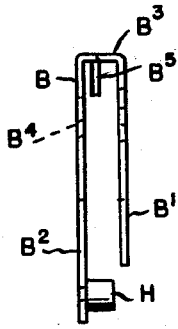
Figure 6:
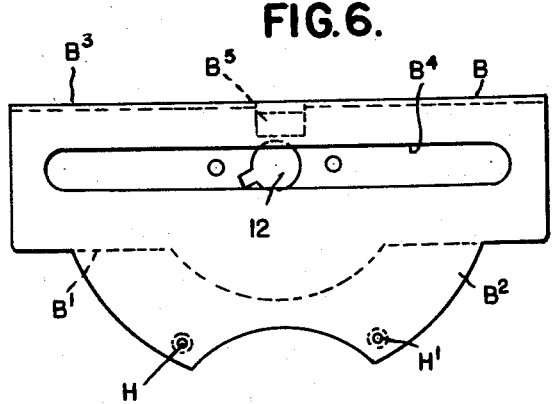

Figs. 6, 7 and 8 respectively are front elevational, side elevational, and plan views of the frame for supporting the operating mechanism.

Figs. 9 and 10 respectively are front and side elevational views of the toggle lever forming a part of the operating mechanism.

Figure 11:
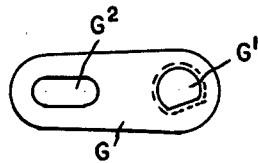

Fig. 11 is an elevational view of the crank arm.

Fig. 12 is an elevational view of the stop washer.

As illustrated, A is the body of a rotary plug type valve and having a conical recess $A^1$ receiving and forming a seat for a correspondingly shaped rotary plug D. $A^2$ and $A^3$ are threaded nipples respectively extending radially and axially from the body A to form gas inlet and outlet connections for gas passages 10 and 11 in said rotary plug D. Preferably opposite sides of the body A are provided with ears $A^4$ and $A^5$ that extend laterally therefrom at the forward end thereof.

B is an inverted U-shaped frame preferably formed of sheet metal and having a rear portion $B^1$ mounted on the valve body A and having a spaced parallel front portion $B^2$. Both of these portions, as well as the top portion $B^3$ of the frame, extend transversely of the body A and laterally beyond opposite sides thereof.

In the rear portion $B^1$ of the frame is an opening 12 receiving an axially extending operating stem $D^1$ of the rotary plug D, while in the front portion $B^2$ in horizontal alignment with the stem $D^1$ is a longitudinally extending slot $B^4$. Suitable screws C and $C^1$ are insertable through the slot $B^4$ to rigidly attach the rear portion $B^1$ of the frame B to the ears $A^4$ and $A^5$.

The operating mechanism includes a forwardly projecting operating handle E extending through and slidable along the slot $B^4$. The inner end of this handle E is attached to a toggle lever F which in turn is operatively connected to a crank arm G secured to the operating stem $D^1$ of the rotary plug D. As shown, the operating stem $D^1$ of the rotary plug D has a flattened face $D^2$ and fits within a correspondingly shaped aperture $G^1$ in the crank arm G. The crank arm G is also provided with a longitudinally extending slot $G^2$ and is held against displacement from the stem $D^1$ by a lug $B^5$ struck inward from the top portion $B^3$ of the frame B.

The handle E has adjacent its inner end a flange $E^1$ bearing against the outer face of the front portion $B^2$ of the frame, and has a portion $E^2$ extending through the slot $B^4$. Such handle E also has at its inner end a portion $E^3$ secured to one end portion $F^1$ of the toggle lever F. The opposite end portion $F^2$ of this toggle lever is bifurcated and has open ended slots $F^3$ and $F^4$ respectively in the furcations thereof. Such slots $F^3$ and $F^4$ are at equal oblique angles to the center line of the toggle lever.

Pins H and $H^1$ on the front portion $B^2$ of the frame are arranged to alternately engage the slots $F^3$ and $F^4$ respectively when the handle E is alternately on opposite sides of the center of the slot $B^4$. There is also a pin I in the longitudinal center line of the toggle lever F which engages the slot $G^2$ of the crank arm G. A head $I^1$ of the pin I is on one side of the crank arm G, and a washer $I^2$ is between the opposite side of the crank arm G and the toggle lever F.

Figure 2:
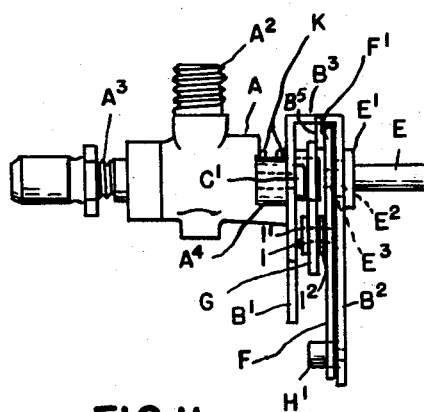
Fig. 2 is a side elevational view of the structure shown in Fig. 1.
Figure 1:
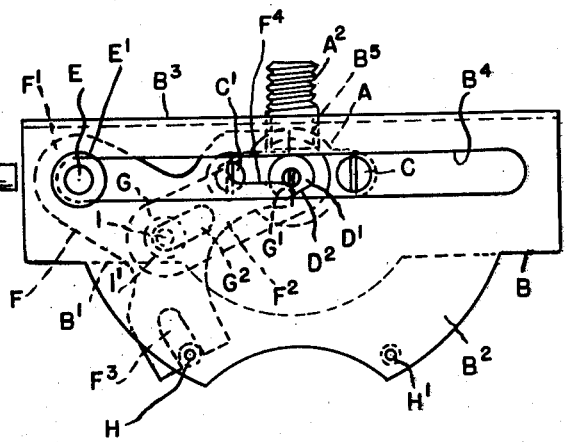
Fig. 1 is a front elevational view of a valve provided with our improved operating mechanism.

Thus, when the operating handle E is at one end of the slot $B^4$ (such as the left end as shown in Fig. 1), the slot $F^3$ of the toggle lever F will be in engagement with the pin H, and the crank arm G will be extended obliquely to the left. As the handle E is moved toward the right in the slot $B^4$, the toggle lever F will fulcrum on the pin H and will also slide downward thereon. This will cause the pin I to move in a direction substantially normal to the initial position of the crank arm G, and as said crank arm changes in its angle, there will be a corresponding change in the direction of movement of the pin I. The pin I also travels along the slot $G^2$ until the crank arm G is in its center position or extending directly downward. Further movement of the handle E to the right in the slot $B^4$ will cause the slot $F^4$ of the toggle lever F to engage the pin $H^1$, and will cause the slot $F^3$ in said toggle lever to be disengaged from the pin H. Further movement of the handle E to the right in the slot $B^4$ will cause the pin I to swing with the crank arm G as it changes its angle until the right hand end of the slot $B^4$ is reached. The movements just described will also have the effect of imparting substantially equal angular advancements of the crank arm G for equal rectilinear advancements of the pin or handle E. Such angular advancement of the crank arm G imparts the desired rotary movement to the rotary plug D.

Rotary movement of the plug D is limited by a washer J sleeved upon the stem $D^1$ and having a radially projecting lug $J^2$ alternately engageable with inclined faces $A^6$ of the ears $A^4$ and $A^5$. As shown, the washer J has a flattened portion J¹ for engagement with the flattened face D² of the stem D¹.

A helical spring K is sleeved on the stem D¹ between the rear portion B¹ of the frame and the rotary plug D to hold the latter against its seat A¹.

The adjustment of the rotary plug D by a rectilinear rather than an annular or angular movement of the operating handle has the advantage that it can be more accurlately performed to obtain just the desired degree of adjustment. Also, by travelling in a horizontal plane, the movement is symmetrical on opposite sides of the longitudinal center of the valve.

What I claim as my invention is:

1. Actuating means for a valve having a rotary plug, said actuating means comprising a body, an operating stem projecting from said body, an inverted channel-shaped frame extending tranversely of said body and laterally beyond opposite sides thereof, the rear side of said channel-shaped frame being mounted on said body and having an opening receiving said operating stem, the front side of said channel-shaped frame having in alignment with said operating stem a longitudinally extending slot constituting a guideway, a forwardly projecting operating handle extending through and slidable lengthwise of said guideway, and connecting mechanism between said operating handle and said stem for converting the sliding movement of one into rotary movement of the other, said connecting mechanism including a toggle lever, a crank arm operatively connected to said stem and toggle lever, and fulcrum means for said toggle lever fixed relative to said frame.

2. The construction in claim 1 in which said toggle lever and crank arm are so connected as to convert successive equal lengths of the sliding movement of said operating handle into substantially equal rotary movements of said crank arm.

3. Actuating means for a valve having a rotary plug, said actuating means comprising a body, an operating stem projecting from said body, an inverted channel-shaped frame extending transversely of said body and laterally beyond opposite sides thereof, the rear side of said channel-shaped frame being mounted on said body and having an opening receiving said operating stem, the front side of said channel-shaped frame having in alignment with said operating stem, a longitudinally extending slot constituting a guideway, a forwardly projecting operating handle extending through and slidable lengthwise of said guideway, and connecting mechanism between said operating handle and said stem for converting the sliding movement of one into rotary movement of the other, said connecting mechanism including a crank arm connected to and extending radially from said stem, a toggle lever between said operating handle and said crank arm, and fulcrum means for said toggle lever fixed relative to said frame.

4. The construction in claim 3 in which said toggle lever has one end thereof connected to said operating handle, said toggle lever being bifurcated at its opposite end to provide spaced furcations and having a pivotal connection with said crank arm intermediate its ends, and said fulcrum means comprises spaced fulcrums with which said furcations successively engage during the pivotal movement of said toggle lever.

5. The construction in claim 4 in which said fulcrums are spaced equally upon opposite sides of the center of said guideway.

6. The construction in claim 5 in which said toggle lever operatively engages the fulcrum which is on the same side of the center of the guideway.

7. Actuating means for a valve having a rotary plug, said actuating means comprising a body, an operating stem projecting from said body, an elongated frame extending transversely of said body and laterally beyond opposite sides thereof, said frame being secured to said body and having in alignment with said stem a longitudinally extending slot constituting a guideway, a forwardly projecting operating handle extending through and slidable lengthwise of said guideway, and connecting mechanism between said operating handle and said stem for converting the sliding movement of one into rotary movement of the other, said connecting mechanism including a toggle lever connected to said operating handle, a crank arm having a pin and slot connection with said toggle lever and connected to said operating stem, and fulcrum means for said toggle lever fixed relative to said frame.

8. Actuating means for a valve having a rotary plug, said actuating means comprising a body, an actuating stem projecting from said body, a frame secured to said body and having means providing an elongated guideway, an operating handle slidable lengthwise of said guideway, and connecting mechanism between said operating handle and said stem for converting the sliding movement of said handle into rotary movement of said stem, said connecting mechanism including a crank arm on said stem, a toggle lever on said operating handle having a pin and slot connection with said crank arm, and fulcrum means for said toggle lever on said frame.

9. Actuating means for a valve having a rotary plug, said actuating means comprising a body, an actuating stem projecting from said body, a frame secured to said body and having means thereon providing an elongated guideway, an operating handle slidable lengthwise of said guideway, and connecting mechanism between said operating handle and said stem for converting the sliding movement of said handle into rotary movement of said stem, said connecting mechanism including a crank arm on said stem, a toggle lever on said operating handle having a pivotal connection with said crank arm, and fulcrum means for said toggle lever on said frame, said toggle lever having a lost motion connection with at least one of said fulcrum means and crank arm.

10. Actuating means for a valve having a rotary plug, said actuating means comprising a body, an actuating stem projecting from said body, means on said body providing an elongated guideway, an operating handle slidable lengthwise of said guideway, and connecting mechanism between said operating handle and said stem for converting the sliding movement of said handle into rotary movement of said stem, said connecting mechanism including a crank arm operatively connected to said stem, a toggle lever pivotally connected to said crank arm, and fulcrum means for said toggle lever fixed relative to said body.

References Cited in the file of this patent

UNITED STATES PATENTS

| 2,142,368 | Mueller | Jan. 3, 1939 |
| 2,712,242 | Davis | July 5, 1955 |

FOREIGN PATENTS

| 328,204 | Great Britain | of 1930 |